United States Patent [19]

Aoki et al.

[11] Patent Number: 5,467,022
[45] Date of Patent: Nov. 14, 1995

[54] DIELECTRIC DETECTING SYSTEM

[75] Inventors: Kouji Aoki; Masaru Yokochi, both of Aichi, Japan

[73] Assignee: Aisin Seiki Kabushiki Kaisha, Kariya, Japan

[21] Appl. No.: 5,083

[22] Filed: Jan. 15, 1993

[30] Foreign Application Priority Data

Jan. 16, 1992 [JP] Japan ................................. 4-005766

[51] Int. Cl.⁶ ........................... G01R 31/02; G08B 13/26
[52] U.S. Cl. ................................................ 324/661; 340/562
[58] Field of Search ................................. 324/661, 663, 324/687, 679, 688, 690; 340/562, 573

[56] References Cited

U.S. PATENT DOCUMENTS

| | | | |
|---|---|---|---|
| 3,723,901 | 3/1973 | Nicolas | 340/562 |
| 3,727,208 | 4/1973 | Anderson et al. | 340/562 |
| 3,898,472 | 8/1975 | Long | 340/562 |
| 4,016,490 | 4/1977 | Weckenmann | 324/688 |
| 4,067,225 | 1/1978 | Dorman et al. | 324/688 |
| 4,320,766 | 3/1982 | Alihanka et al. | 340/562 |
| 4,796,013 | 1/1989 | Yasuda et al. | 340/652 |
| 4,887,024 | 12/1989 | Sugiyama | 340/562 |
| 5,223,796 | 7/1993 | Waldman et al. | 324/690 |

FOREIGN PATENT DOCUMENTS 62-91882  4/1987  Japan .

OTHER PUBLICATIONS

Patent Abstracts of Japan, vol. 16, No. 15 p. 1298 (Jan. 14, 1992) & JP-3-233391.
Patent Abstracts of Japan, vol. 13, No. 353 p. 913 (Aug. 8, 1989) & JP-1-113692.
Patent Abstracts of Japan, vol. 11, No. 366 p. 641 (Nov. 28, 1987) & JP-62-138780.
Patent Abstracts of Japan, vol. 12, No. 93 (Mar. 20, 1988) & JP-62-225985.

*Primary Examiner*—Maura K. Regan
*Attorney, Agent, or Firm*—Sughrue, Mion, Zinn, Macpeak & Seas

[57] ABSTRACT

A dielectric detecting system comprises: an earth electrode; a sensor electrode opposed to the earth electrode for constituting a first condenser therebetween whose electric capacitance varies in dependence on an existence of the dielectric; a medium electrode positioned between the earth electrode and the sensor electrode for constituting a second condenser between the medium electrode and the earth electrode and a third condenser between the medium electrode and the sensor electrode in such a manner that one of an electric capacitance of the second condenser and an electric capacitance of the third condenser serves for detecting an other dielectric; and an operational amplifier for equalizing electric potential of the medium electrode to that of the sensor electrode.

2 Claims, 5 Drawing Sheets

DIELECTRIC DETECTING SYSTEM

BACKGROUND OF THE INVENTION

1. Field of the Invention

This invention relates to a dielectric detecting system of a control device for controlling a device such as an automatic fastening seat belt, a power operated window and an automatic locking device of a door, comprising a pair of electrodes which sense the variation of an electrostatic capacitance between the electrodes and used for detecting the presence of a passenger in a vehicle.

2. Description of the Related Art

A conventional dielectric detecting system is disclosed in Japanese Patent publication No. 62-91882. The dielectric detecting system disclosed in the prior art comprises a conductive plate disposed in a seat of a vehicle as a sensor electrode and a vehicle body as an earth electrode, and detects the presence of a passenger as a dielectric to be detected by means of sensing the variation of an electrostatic capacitance between the electrodes.

However the system sometimes detects a dielectric which should not be detected such as a seat cushioning pad by the transition of the environments (such as the transformation of the shape of the seat cushioning pad).

SUMMARY OF THE PRESENT INVENTION

It is an object of the present invention to provide a dielectric detecting system which prevents the dielectric not to be detected from being detected in spite of the transition of the environments.

It is another object of the present invention to provide a dielectric detecting system which has a compact size.

It is a further object of the present invention to provide a passenger detecting system for a vehicle which prevents the system from failing to detect the passenger on a seat of the vehicle in spite of the transition of the environments.

To achieve the above mentioned object, this invention provides a dielectric detecting system comprising: an earth electrode; a sensor electrode opposed to the earth electrode for constituting a first condenser therebetween whose electric capacitance varies in dependence on an existence of the dielectric; a medium electrode positioned between the earth electrode and the sensor electrode for constituting a second condenser between the medium electrode and the earth electrode and a third condenser between the medium electrode and the sensor electrode in such a manner that one of an electric capacitance of the second condenser and an electric capacitance of the third condenser serves for detecting an other dielectric; and an equalizing means for equalizing electric potential of the medium electrode to that of the sensor electrode.

BRIEF DESCRIPTION OF THE DRAWINGS

The features and advantages of the dielectric detecting system according to the present invention will be more clearly appreciated from the following description in conjunction with the accompanying drawings wherein.

DETAILED DESCRIPTION OF A PREFERRED EMBODIMENTS OF THE INVENTION

Figure 1:
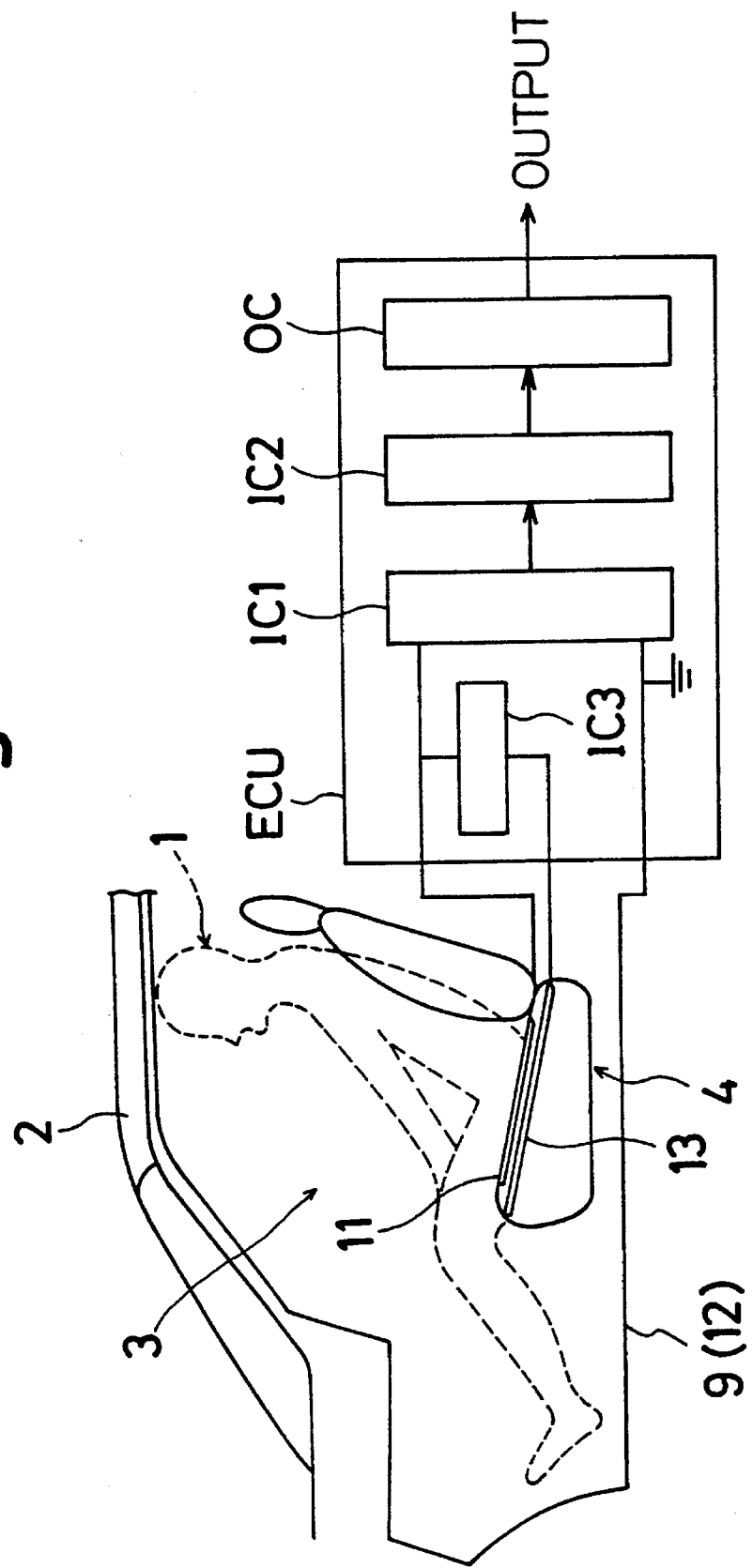
FIG. 1 is a whole view of a passenger detecting apparatus comprising the dielectric detecting system of the present invention.

FIG. 1 shows a passenger detecting apparatus comprising a dielectric detecting system of the present invention. The apparatus comprises a seat 4 on which a passenger 1 sits in a cabin space 3 of a vehicle 2.

Figure 2:
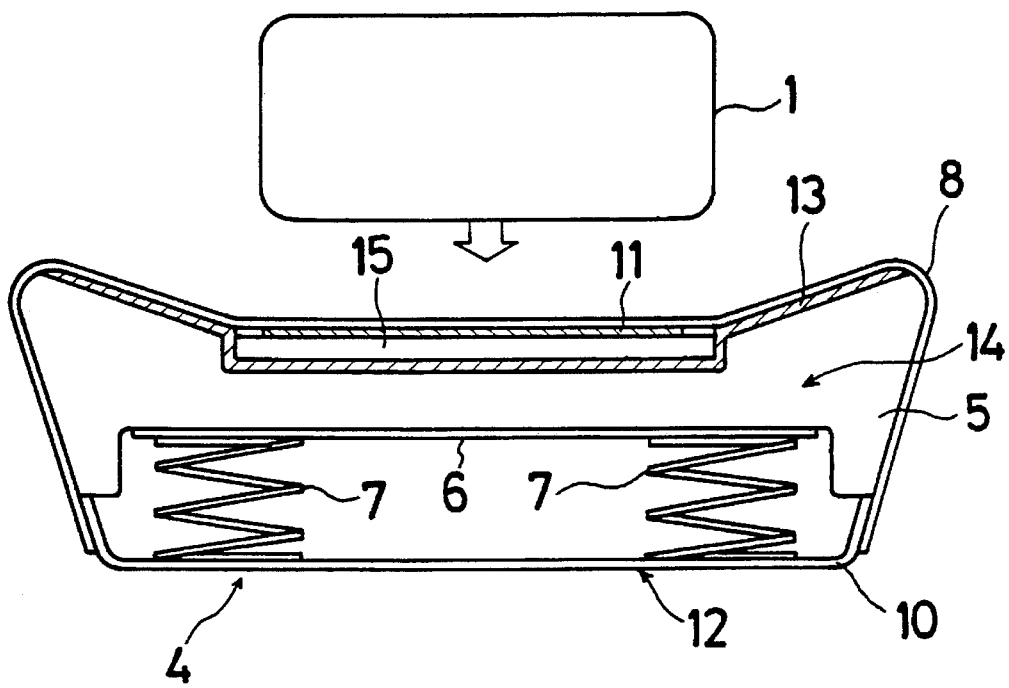
FIG. 2 is a sectional view of a seat of a vehicle comprising the dielectric detecting system of the present invention.
Figure 3:
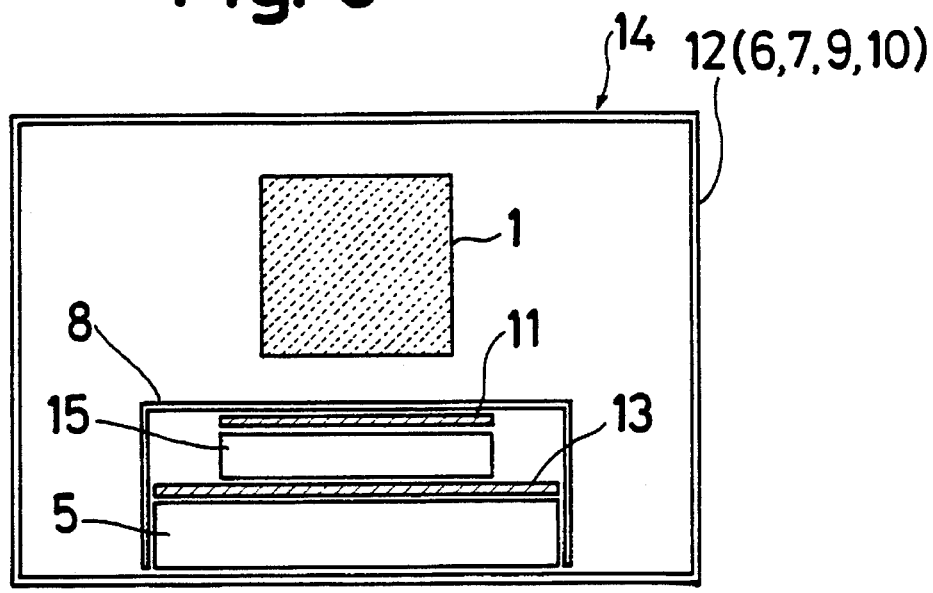
FIG. 3 is a schematic view substantially equal to the FIG. 2.
Figure 4:
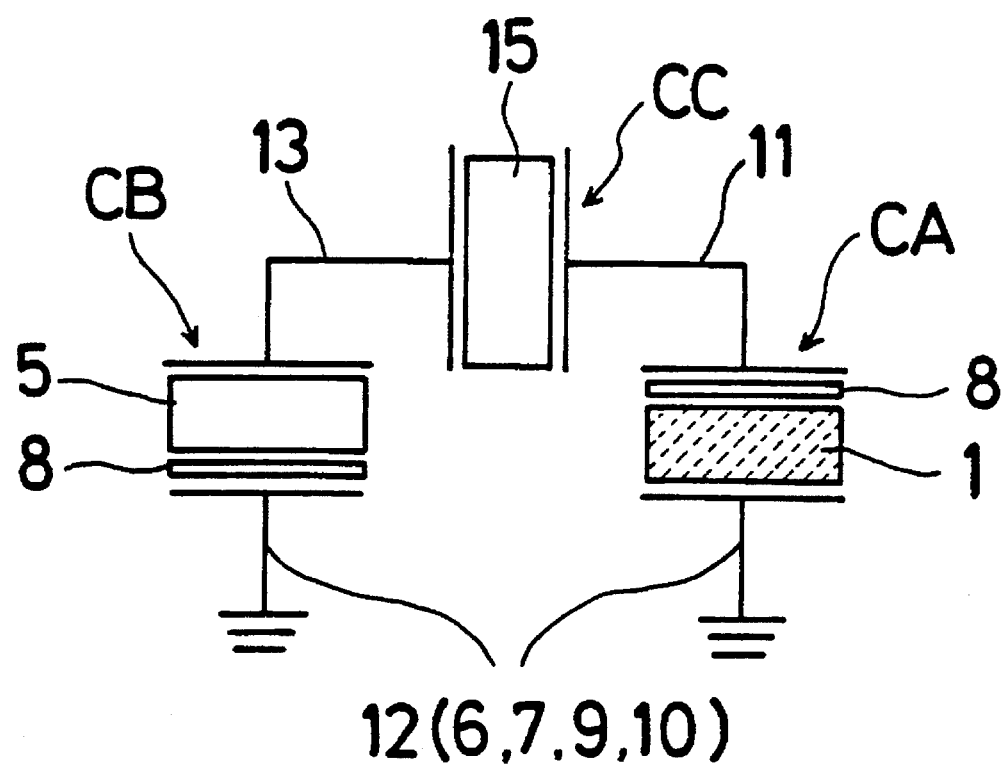
FIG. 4 is a view which illustrates an equivalent circuit of FIG. 3.

The seat 4 comprises, as shown in FIGS. 1 and 2, a main cushion 5 which defines an outer form of the seat 4, a seat spring 6 and a plurality of coil springs 7 providing cushioning force, a wrapping 8 and a seat pan 10. The wrapping 8 covers the main cushion 5, the seat spring 6, and the coil springs 7. The seat pan 10 is fixed on a body 9 of the vehicle 2 by the medium of a slide rail or a bracket (not shown in the figures). The seat 4 includes a sensor 14 formed with a sensor electrode 11, an earth electrode 12 and a medium electrode 13 which are independent each other. The sensor electrode 11 which is in the form of a rectangular conductive cloth is disposed between the wrapping 8 and the main cushion 5. The medium electrode 13 made of a conductive cloth and shaped into a square in plane is curved in the shape of a rectangle in the sectional view and is disposed in order to cover the sensor electrode 11 in such a manner that the center portion of the medium electrode 13 is between the sensor electrode 11 and the main cushion 5 and the edge portion of the medium electrode 13 is between the wrapping 8 and the main cushion 5. The seat spring 6, the coil spring 7, the seat pan 10 and the body 9 of the vehicle 2 constitute the earth electrode 12. An urethane member 15 is disposed between the sensor electrode 11 and the medium electrode 13. FIG. 3 shows a schematic view of the sensor 14 in the seat 4 and FIG. 4 shows an equivalent circuit of FIG. 3. In FIG. 4 a condenser CA is formed by the sensor electrode 11 and the earth electrode 12. The condenser CA varies its electrostatic capacitance charged between the sensor electrode 11 and the earth electrod 12 depending on the passenger 1 and the wrapping 8. A condenser CB is formed by the medium electrode 13 and the earth electrode 12. The condenser CB varies its electrostatic capacitance charged between the medium electrode 13 and the earth electrode 12 depending on the main cushion 5 and the wrapping 8 a condenser CC is formed by the sensor electrode 11 and the medium electrode 13. The condenser CC varies its electrostatic capacitance charged between the sensor electrode 11 and the medium electrode 13 depending on the urethane member 15.

Figure 5:
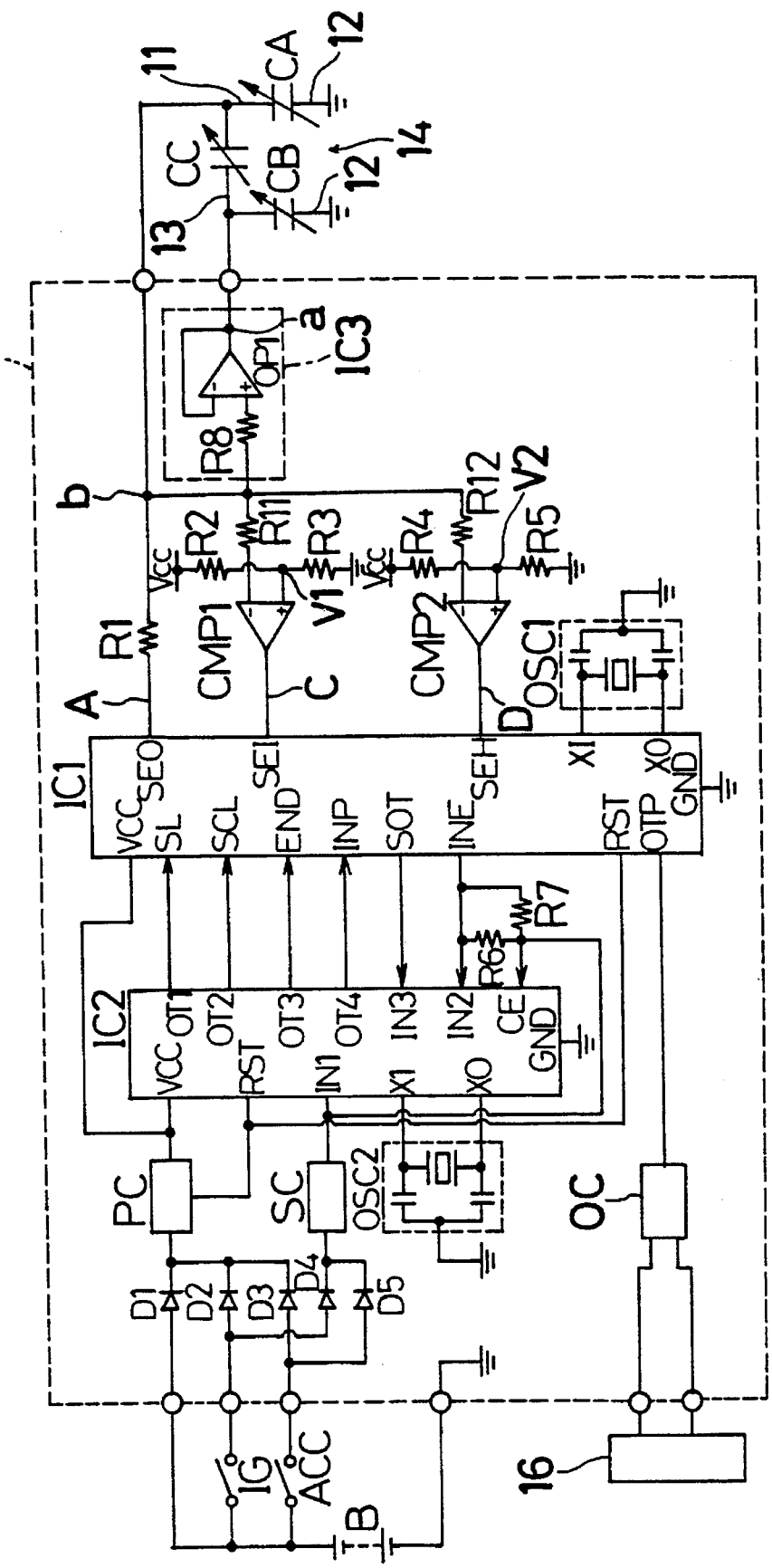
FIG. 5 is a view which illustrates an embodiment of an electric circuit included in the passenger detecting apparatus shown in the FIG. 1.

In FIG. 5 a detecting circuit IC1 in a control apparatus ECU provided with a gate array detects the variation of the electrostatic capacitance of the condenser CA and controls a start and a stop of a judging circuit IC2. The judging circuit IC2 with a micro computer judges the presence of the passenger 1 by an output signal of the detecting circuit IC1. An equalizing circuit IC3 for equalizing electric potential is formed by a voltage follower with an operational amplifier OP1. The variations of the electrostatic capacitance of the condenser CB merely depend on the variations of the electrostatic capacitance of the condenser CA because the equalizing circuit IC3 equalizes electric potential of the electrodes 13 to that of the electrodes 11.

The sensor electrode 11 in the sensor 14 is connected to an output port SEO of the detecting circuit IC1 through a resistance R1. The medium electrode 13 in the sensor 14 is connected to an output terminal of the operational amplifier OP1, and an anti-inverting input terminal of the operational amplifier OP1 is connected to a junction point b with the sensor electrode 11 and the resistance R1 through a resistance R8. The junction point b is connected to an inverting terminal of a first comparator CMP1 through a resistance R11 and to an inverting terminal of a second comparator CMP2 through a resistance R12. Value VTH1 of a first threshold of voltage caused by sharing voltage of a voltage regulator VCC with resistances R2 and R3 is inputted into an anti-inverting input terminal of the first comparator CMP1. Value VTH2 of a second threshold of voltage caused by sharing the voltage of the voltage regulator VCC with resistances R4 and R5 is inputted into an anti-inverting input terminal of the second comparator CMP2. The first comparator CMP1 is provided for detecting the presence of the passenger, and the second comparator CMP2 is provided for detecting a lowering of value of a resistance for the prevention of a dielectric breakdown (not shown in the Figures), and the voltage VTH2 is provided to be higher than the voltage VTH1. An output terminal of the first comparator CMP1 is connected to an input port SEI of the detecting circuit IC1, and an output terminal of the second comparator CMP2 is connected to an input port SEH of the detecting circuit IC1.

The judging circuit IC2 comprises a ROM and a RAM (not shown in the Figures), and each of output ports OT1, OT2, OT2, OT3 and OT4 is respectively connected to each of input ports SL, SCL, END and INP of the detecting circuit IC1. An output port INE of the detecting circuit IC1 is connected to an input port IN2 and an input port CE of the judging circuit IC2 through resistances R6 and R7. And an output port SOT of the detecting circuit IC1 is connected to an input port IN3 of the judging circuit IC2. The output port INE sends an enable signal, that is to say, a signal of permitting acceptance which permits the judging circuit IC2 to accept signals in a predetermined cycle, and the output port SOT transmits data of the electrostatic capacitance to the judging circuit IC2 according to the signal of permitting acceptance. The judging circuit IC2 sends a signal which orders the detecting circuit IC1 to set the data to an input port SL and sends a clock signal to an input port SCL. The judging circuit IC2 sends a signal to an input port END when the judging circuit IC2 accepts the signal of permitting acceptance for determining the presence of the signal of permitting acceptance. Then, the judging circuit IC2 sends a signal of judging the presence of the passenger to an input port INP.

An input circuit SC is connected to an input port IN1, and a conjunction between a resistance R6 and R7. A power supply circuit PC is connected to a port VCC of the detecting circuit IC1 and the judging circuit IC2, for sending respectively a reset signal to the detecting circuit IC1 and the judging circuit IC2. The power supply circuit PC is connected to a power supply B through a diode D1 and is connected to one side of a diode D2 and one side of a diode D3. The other side of the diode D2 and the other side of the diode D3 are respectively connected to the power supply B through an ignition switch IG and an accessory switch ACC. The input circuit SC is connected to one side of a diode D4 and one side of a diode D5. The other side of the diode D4 and the other side of the diode D5 are respectively connected to the power supply B through the ignition switch IG and the accessory switch ACC. Ports X1 and X0 of the detecting circuit IC1 and the judging circuit IC2 are connected to an oscillator OSC1 and OSC2. Ports GND of the detecting circuit IC1 and the judging circuit IC2 are grounded. A port OTP is connected to a system 16 out of the control apparatus ECU through an output circuit OC.

A description of the operation of the dielectric detecting system according to the present invention will be detailed hereinafter. The output port SEO sends a pulse signal with a predetermined cycle, and the resistance R1 and the sensor 14 generate a signal which is out of phase relative to the pulse signal according to the electrostatic capacitance of each condenser CA, CB and CC. The operational amplifier OP1 equalizes the electric voltage at the junction point a to the voltage at the junction point b, that is to say, the electric voltage difference between electrodes of the condenser CC is extinguished. The electrostatic capacitance of the condensers CB and CC cancel each other and the condensers CB and CC fall to influence to the signal which is out of phase relative to the pulse signal.

The first comparator CMP1 compares the signal which is out of phase to the pulse signal with the value VTH1 of the first threshold of the voltage and generates a detecting signal out of phase with the pulse signal. The detecting circuit IC1 accepts the detecting signal from the input port SEI, the detecting circuit IC1 calculates an exclusive OR with the pulse signal and the detecting signal and generates a phase signal. The detecting circuit IC1 calculates an average of several values of the phase signal and sends the average value as a final capacitance datum to the judging circuit IC2 in a predetermined interval.

Figure 6:
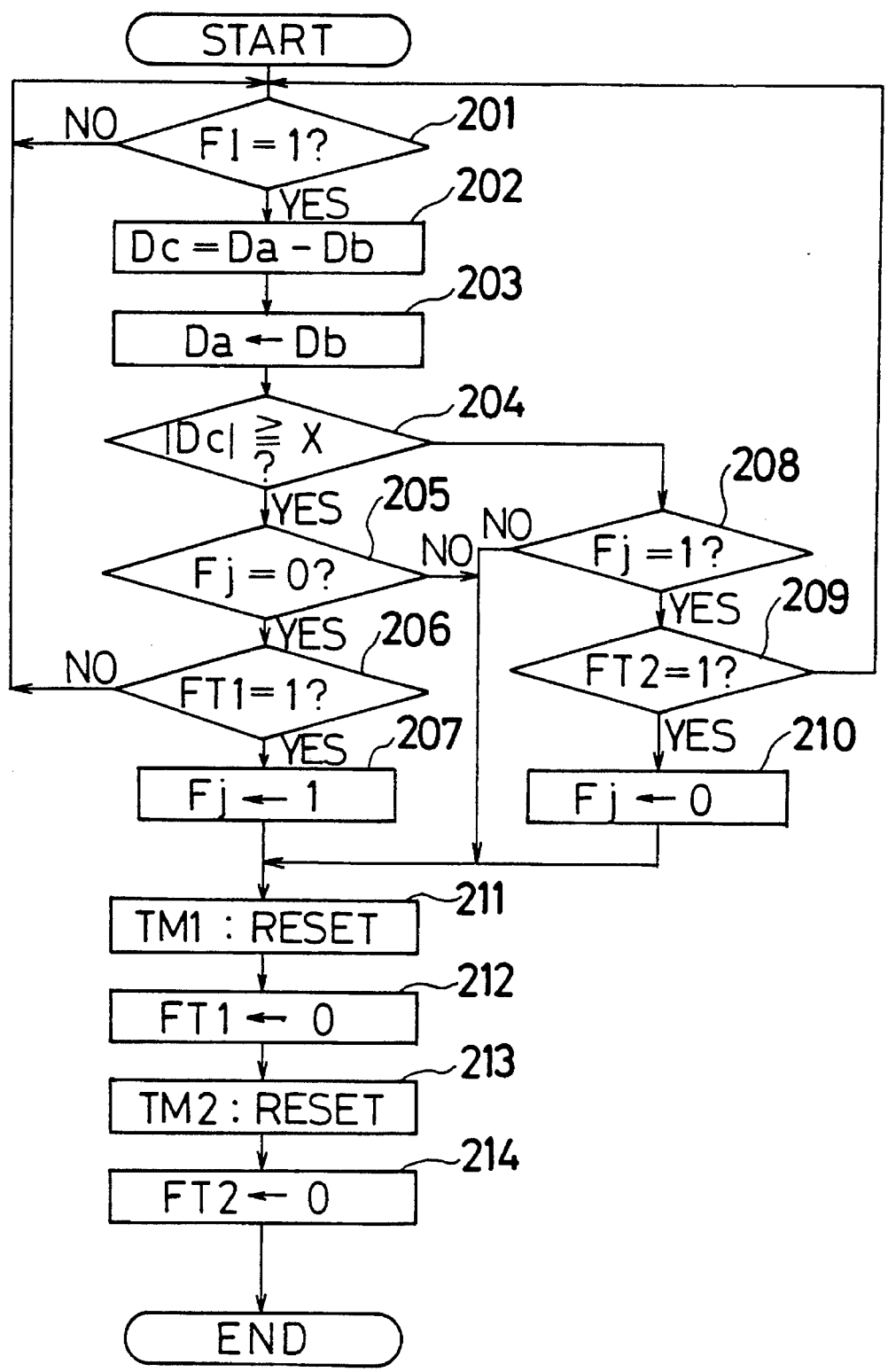
FIG. 6 is a flow-chart which illustrates the operation of the detecting circuit shown in the FIG. 5.

In FIG. 6 step 201 determines whether a flag F1 is set or not at 0.5 second intervals. The flag F1 is set in "1" when the final capacitance datum is transmitted from the detecting circuit IC1 to the judging circuit IC2. If the flag F1 is set in "1", a control of the control apparatus ECU goes to step 202. Step 202 determines whether a difference of a former capacitance datum Da stored in a former capacitance data resister from a present capacitance datum Db stored in a present capacitance data resister is larger than a predetermined value or not. The difference of the former capacitance datum Da from the present capacitance datum Db calculated in step 202, as a variation datum Dc, is stored in a capacitance variation storing resister. In step 203 the present capacitance datum Db replaces the former capacitance datum Da and is stored in the former capacitance data resister. In step 204 an absolute value of the variation datum Dc is compared with the predetermined value. If the absolute value of the variation datum Dc is larger than the value X, the control goes to step 205, and step 205 determines whether a flag FJ indicating the presence of the passenger is set in "1" or not. The flag FJ set in "1" indicates "The passenger is on the seat" and the flag FJ set in "0" indicates "No passenger is on the seat". If the flag FJ is set in "0" in step 205, the control goes to step 206, and step 206 determines whether a flag FT1 is set in "1" or not. If the flag FT1 is set in "1", the control goes to step 207, and the flag FJ is set in "1". The flag FT1 is set in "1" when a timer TM1 is overflowed. The timer TM1 is operated at time which the first state of the control (indicating "No passenger is on the seat") changes into the second state of the control (indicating "The passenger is on the seat"). To the contrary, a flag FT2 is set in "0" when a timer TM2 is overflowed. The timer TM2 is operated at time which the second state of the control (indicating "The passenger is on the seat") changes into the first state of the control (indicating "No passenger is on the seat"). In step 206 if the flag FT1 is set in "1", that is to say, a predetermined time passed after the first state of the control (indicating "No passenger is on the seat") changes into the second state of the control (indicating "The passenger is on the seat"), the control goes to step 207, and the flag FJ is set in "1". In step 204, if the absolute value of the variation datum Dc is less than the value X, the control goes to step 208, and step 208 determines whether the flag FJ is set in "1" or not. If the flag FJ is set in "1", the control goes to step 209, and step 209 determines whether the flag FT2 is set in "1" or not. In step 209 if the flag FT2 is set in "1", that is to say, a predetermined time passed after the state of the control (indicating "The passenger is on the seat") changes into the state of the control (indicating "No passenger is on the seat"), the control goes to step 210, and the flag FJ is reset in "0". In case of determining the flag FJ is set in "1" in step 205 or determining the flag FJ is set in "0" in step 208 or determining the flag FJ is set in "1" in step 207 or determining the flag FJ is reset in "0" in step 210, the control goes to steps 211, 212, 213 and 214. In steps 211, 212, 213 and 214 the timer TM1 and TM2 are reset and the flag FT1 and FT2 are reset.

And the equalizing circuit IC3 can be included in the sensor 14 not in the control apparatus ECU.

In the above mentioned embodiment the detecting signal is generated, depending on merely the electrostatic capacitance of the condenser CA because the electrostatic capacitance of the condensers CB and CC cancel each other. And the signal is independent of the main cushion 5 and the urethane 15, the dielectric detecting system in the present invention prevents the dielectric which should not be detected from being detected in spite of the transition of the environments.

While the invention has been particularly shown and described with reference to preferred embodiment thereof, it will be understood by those skilled in the art that the foregoing and other changes in form and details can be made therein without departing from the spirit and scope of the invention.

What is claimed is:

1. A dielectric detecting system comprising:

an earth electrode;

a sensor electrode opposed to the earth electrode for constituting a first condenser therebetween whose electric capacitance varies in dependence on an existence of a dielectric;

a medium electrode positioned between the earth electrode and the sensor electrode for constituting a second condenser between the medium electrode and the earth electrode and for constituting a third condenser between the medium electrode and the sensor electrode in such a manner that one of an electric capacitance of the second condenser and an electric capacitance of the third condenser serves for detecting an other dielectric; and an equalizing means for equalizing electric potential of the medium electrode to that of the sensor electrode.

2. A dielectric detecting system as recited in claim 1, wherein the equalizing means is an operational amplifier.

* * * * *